No. 740,902. Patented October 6, 1903.

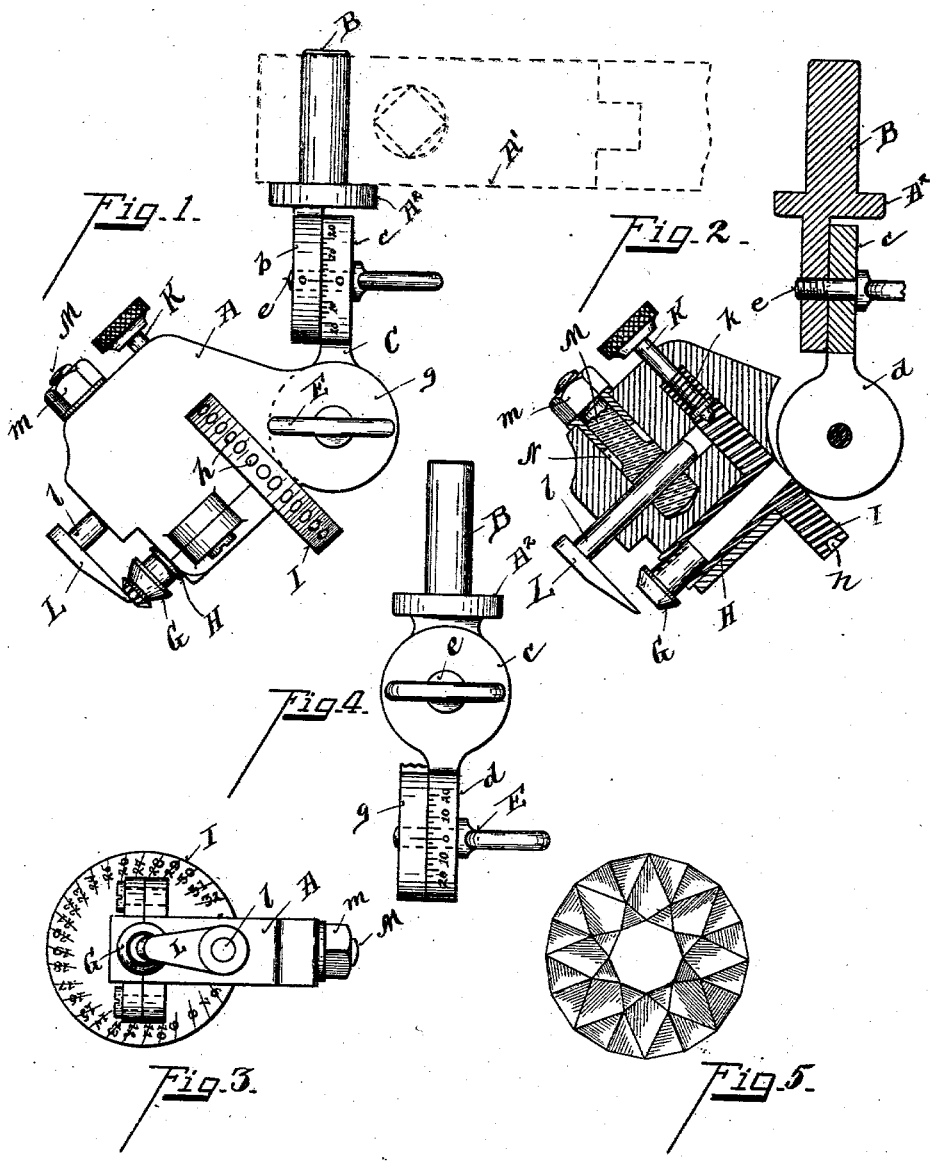

UNITED STATES PATENT OFFICE.

HENRY W. OOSTENDORP, OF CINCINNATI, OHIO.

HOLDER FOR CUTTING PRECIOUS STONES.

SPECIFICATION forming part of Letters Patent No. 740,902, dated October 6, 1903.

Application filed January 26, 1903. Serial No. 140,666. (No model.)

*To all whom it may concern:*

Be it known that I, HENRY W. OOSTENDORP, a citizen of the United States, residing at Cincinnati, in the county of Hamilton and State of Ohio, have invented certain new and useful Improvements in Holders for Cutting Precious Stones, of which the following is a specification.

My invention relates to a diamond-polishing tool which is mounted upon a hand-holder that is rested upon the table and bodily placed on and lifted off the table by the operator.

In polishing diamonds it is desirable that the gem-holder may be raised vertically by the operator, so as to subject the stone to the polishing-plate at any desired angle and to raise and lower the polishing-tool vertically, so that the plane of the facet shall be at all times parallel to the plane of the polishing-disk. In grinding or polishing precious stones—such as diamonds, rubies, &c.—it is necessary not only to form the facets at any desired angle, but the different facets must have an exact uniform angle. The stone has to be turned so that the work may be done with the grain. Hence the facets cannot be cut by simply turning the stone in its holder to present a different facet, but the holder itself must be swiveled or turned around in order to present the stone to the face of the polishing-disk according as the grain of the stone requires. To accomplish this, the diamond-holder must be mounted on a swiveling stem, so that the entire holder can be revolved horizontally around. The holder should likewise have adjustment radially to the horizontal line and radially to a vertical line, and these adjustments must be made exact in order to have uniformity of angle-facets. For this purpose the swiveling parts must have indices for exact adjustment. My invention is designed to accomplish these different results by means of the tool-support being mounted upon a swiveling stem, which stem is made of two sections, as will be hereinafter explained.

Various other features of my invention will be more fully set forth in the description of the accompanying drawings, making a part of this specification, in which—

Figure 1 is a front elevation of my improved holder. Fig. 2 is a transverse central vertical section. Fig. 3 is a bottom plan view. Fig. 4 is a side elevation of the stock-support. Fig. 5 is a diagram of the face of a stone, showing three tiers of facets of the finished cut stone.

A represents the stock of the chuck.

B represents a rigid stem which is journaled in the split clamp A' of the hand-holder provided with the usual foot-rest, the arm of the hand-holder only being indicated, (shown in dotted lines, Fig. 1,) which holder is raised and lowered to adjust the stone and to hold it against the face of the cutting-disk in the same manner that the ordinary soft-stem chuck is employed. The stem has the stop-shoulder $A^2$ bearing against the face of the split clamp, whereby the stem can be swiveled without changing its vertical position in the clamp and the stone properly adjusted for grinding in the line of the grain without altering the other adjustments. The stem or chuck-support is made of two pieces. $b$ represents a circular flange or disk rigidly secured by its neck vertically below the base of the spindle. C represents the axial support of the chuck proper. It is provided with two circular disks $c\ d$. Disk $c$ is provided with an axial support $e$, which in the form shown consists of a thumb-screw having threads on its forward end engaging the screw-threads of the disk $b$. On the front periphery of the disk $c$ are index-marks indicating angles from one to twenty degrees each way from the neutral line O. By this means the chuck may be set at varying angles horizontally to the vertical plane of the axis of the chuck-support. Disk $d$ is supported in any desired plane to the disk-like projection $g$ of the chuck-stock A by means of an axial thumb-screw E, similar in construction to the axial bolt $e$. Similar indices to angles are made on the periphery of the disks $d\ g$ to that shown in the disks $b\ c$. These two angular adjustments of the chuck are very important. The adjustments of the chuck upon a stem-support to different angles to horizontality is made to determine the angle of the facets; but it is very important both in cutting and in polishing the stone, so that the cutting will be done with the grain. As the grains of stones vary indefinitely, this setting must be determined for each stone to be cut. The adjustment of the tool to accommodate itself to the grain of the stone is obtained by the stem adjustment to varying angles to the vertical, which is accomplished by loosening the axial nut e, when the chuck may be moved freely to the desired angle or position and the nut tightened.

In the cutting of diamonds the diamond-base clamp has to be repeatedly adjusted radially to bring the stone into position for cutting the several facets. Thus, say, in cutting the first or lower tier of facets it is usual to cut one facet, then release the clamp and swing the diamond just half around and cut the opposite facet, then again to adjust the diamond to cut facet No. 3 or one-half way between the two previously-cut facets, so as to get a more accurate cutting; but with the ordinary chuck these adjustments had to be made solely by the eye without an accurate gage. As a result the several facets are of not necessarily equal dimensions, and owing to the softness of the flexible chuck-stem the angle of inclination varied somewhat. The means herein shown and described provide for an accurate adjustment as the stone is turned to cut the succeeding facets.

The following instrumentalities are provided to secure accurate radial adjustment of the stone:

G represents the base on which the stone is supported. In the preferred form shown it is an interchangeable bushing having a bearing in the tube H, so that different sizes of bushings may be employed. I represents a gage-disk, to which the tube H is rigidly secured. Tube H serves as an axial support for the disk I, one segment of which moves freely in a slot pierced in the stock of the chuck. Disk I on its periphery is provided with a continual series of holes h, equidistant apart and preferably thirty-two in number, corresponding to the number of facets of the outer or peripheral series shown in diagram Fig. 4.

K represents a set-bolt, which is normally held in position engaging one of the holes in disk I by a spiral spring k. When it is desired to adjust the disk I radially to swivel the stone and set it in position, the bolt K is raised to release its pointed stem from engagement with the disk. The disk I is then free to revolve to the desired position, which is indicated by the index-marks on the face of the disk, as shown in Fig. 3. When it is brought into desired position, the operator lets go of the bolt K, and the spring brings it into place, locking the disk in the desired fixed position.

In order to clamp the stone in position and allow the clamp to be easily released, yet rigid when adjusted, the following devices are provided:

$l$ represents a stem rotatable and adjustable longitudinally in the stock, having a radial finger L, adapted to bear against the top of the table of the stone and clamp the same to the seat in the end of the tube-bushing G, permitting the stone, its bushing G, and tube H to be turned upon the end of the finger without detaching or adjusting the stem $l$. Thus the stone can be rotated to present new facets to the cutter without being unclamped from its seat on the stock. Traversing a bore at right angles is another bore N, in which is seated a clamping-bolt M. This clamping-bolt is pierced with an orifice through which the stem of the clamp L passes.

$m$ represents a nut threaded onto the projecting end of the clamp-bolt. When this nut $m$ is turned down, the clamp-bolt is raised and clamps or locks the stem of clamp L firmly in position. Thus the clamp can quickly be adjusted and easily locked in position.

By the means herein shown and described the chuck can be readily and easily set at any desired angle, the stone can quickly and easily be adjusted radially on its axial support to any desired position, and an accurate spacing of the facets may be obtained. As a result of the manipulation of this chuck equal facets of uniform angles and dimensions may be readily cut on the face of the stone, effecting a great saving of time in adjustment as well as obtaining a uniform cutting of the facets on the face of the stone. By means of this device operated in the manner described uniformity of cutting is obtained, as the gage by which the operator works enables the cutting to be effected to a degree of exactness not hitherto obtained in the art of cutting precious stones.

Having described my invention, I claim—

1. A device for holding precious stones composed of a holder, a swiveling stem journaling therein, composed of two sections, one swiveled upon the other having a horizontal axis and clamping devices, a stock mounted upon the lower stem-section carrying a stone-holder journaled upon an axis having bearings in said stock, an index setting-disk mounted upon the said tool-holder and locking devices for holding said disk in its adjusted position, substantially as described.

2. A device for holding precious stones composed of a holder, a swiveling stem journaled therein composed of two sections, one swiveled upon the other, having a horizontal axis, a stock carrying the stone-holder swiveled upon the lower stem-section, the axis of which is horizontal and at right angles to the axis of the stem-section, clamping devices for holding said swiveled parts in fixed position, an index-disk mounted upon the journaled tool-holder and a stop device for holding said disk in its adjusted position, substantially as described.

3. In combination with a stock swiveled upon a stem which in turn is swiveled in the arm of a hand-holder, a base-support for the stone consisting of a stem longitudinally journaled in the stock at an inclined angle to the axis of the stock, a setting-disk mounted upon said stem and provided with equidistant orifices, a spring-supported locking-stem supported in said stock and adapted to automatically engage any one of said orifices, substantially as described.

4. In a diamond-cutter, a stock-block, a rotatable seat for the stone, mounted thereon, a clamp, the stem of which engages into the stock-block, parallel with the axis of the stone, a clamp-bolt engaging into the stock-block and against the stem of the clamp at right angles thereto, a finger on the end of the stem forming a pivotal finger-bearing on top of the stone, and means for rotating the clamped stone in step movements, substantially as specified.

In testimony whereof I have hereunto set my hand.

HENRY W. OOSTENDORP.

Witnesses:
OLIVER B. KAISER,
IDA J. LUCAS.